United States Patent
Storm et al.

(10) Patent No.: US 9,631,711 B2
(45) Date of Patent: Apr. 25, 2017

(54) ACTUATOR ARRANGEMENT AND CONTROL SURFACE ARRANGEMENT, ESPECIALLY FOR AN AIRCRAFT

(71) Applicants: Stefan Storm, Unterschleißheim (DE); Boris Grohmann, Frankreich (DE)

(72) Inventors: Stefan Storm, Unterschleißheim (DE); Boris Grohmann, Frankreich (DE)

(73) Assignee: EADS DEUTSCHLAND GMBH, Ottobrunn (DE)

( * ) Notice: Subject to any disclaimer, the term of this patent is extended or adjusted under 35 U.S.C. 154(b) by 451 days.

(21) Appl. No.: 14/107,344

(22) Filed: Dec. 16, 2013

(65) Prior Publication Data

US 2014/0217235 A1    Aug. 7, 2014

(30) Foreign Application Priority Data

Dec. 17, 2012   (EP) ..................................... 12197605

(51) Int. Cl.
*F16H 21/44* (2006.01)
*B64C 27/615* (2006.01)
*B64C 27/72* (2006.01)
*B64C 13/28* (2006.01)

(52) U.S. Cl.
CPC .............. *F16H 21/44* (2013.01); *B64C 13/28* (2013.01); *B64C 27/615* (2013.01); *B64C 27/72* (2013.01); *B64C 2027/7283* (2013.01); *Y02T 50/34* (2013.01); *Y10T 74/18888* (2015.01)

(58) Field of Classification Search
CPC ....... B64C 13/28; B64C 13/30; B64C 27/615; B64C 27/72; F16H 21/44

USPC ................................ 74/480 R, 490.07, 490.1
See application file for complete search history.

(56) References Cited

U.S. PATENT DOCUMENTS

| | | | |
|---|---|---|---|
| 3,051,137 A * | 8/1962 | Kutzler | B64C 13/00 244/99.4 |
| 5,224,862 A | 7/1993 | Sullivan | |
| 6,231,013 B1 | 5/2001 | Jaenker | |
| 6,294,859 B1 | 9/2001 | Jaenker | |
| 2002/0141867 A1 | 10/2002 | Preissler | |
| 2006/0267523 A1 | 11/2006 | Seelig et al. | |

(Continued)

FOREIGN PATENT DOCUMENTS

WO      2004/066481 A2    8/2004

OTHER PUBLICATIONS

The extended European search report of corresponding European application No. 12197605.4-1753, issued on Aug. 6, 2013.

*Primary Examiner* — Nicholas McFall
(74) *Attorney, Agent, or Firm* — Global IP Counselors, LLP

(57) ABSTRACT

An improved actuator arrangement for operating a driven element with different actuators. The actuator arrangement comprises a first actuator that drives a driven element in a first direction via a first output member and a second actuator that drives the driven element in a second direction opposite to the first direction via a second output member. The first and second actuators are configured to work in a counter-acting manner to move the driven element in the first and second directions. An additional connecting and supporting device is connected between the first and second output members to support the output members to bear transversal forces transversal to the moving direction and/or to bear pre-load force for pre-loading the actuators.

20 Claims, 8 Drawing Sheets

(56) References Cited

U.S. PATENT DOCUMENTS

2010/0181415 A1 7/2010 Altmikus et al.
2012/0305698 A1* 12/2012 Schank ................ B64C 27/001
244/17.11

* cited by examiner

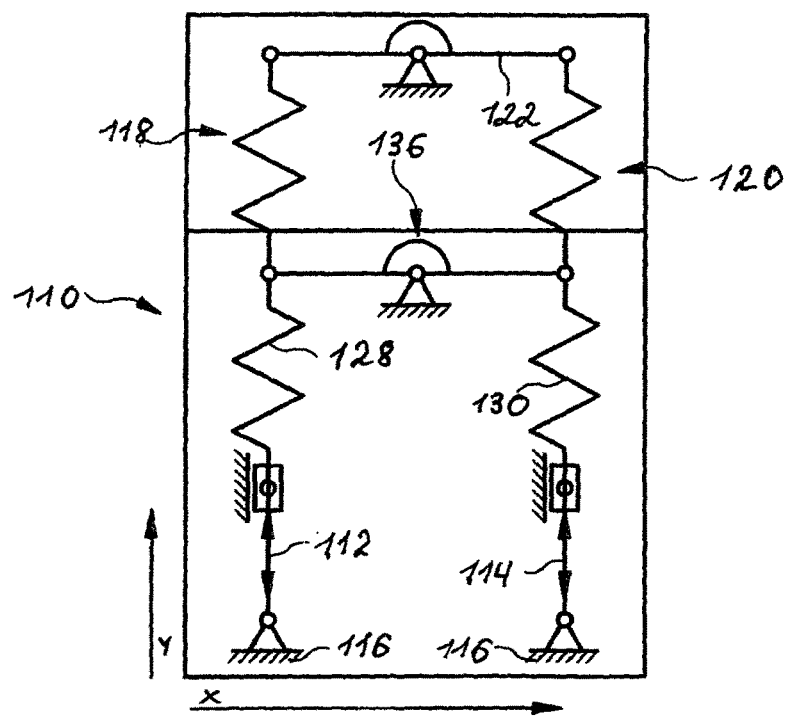
Fig. 5
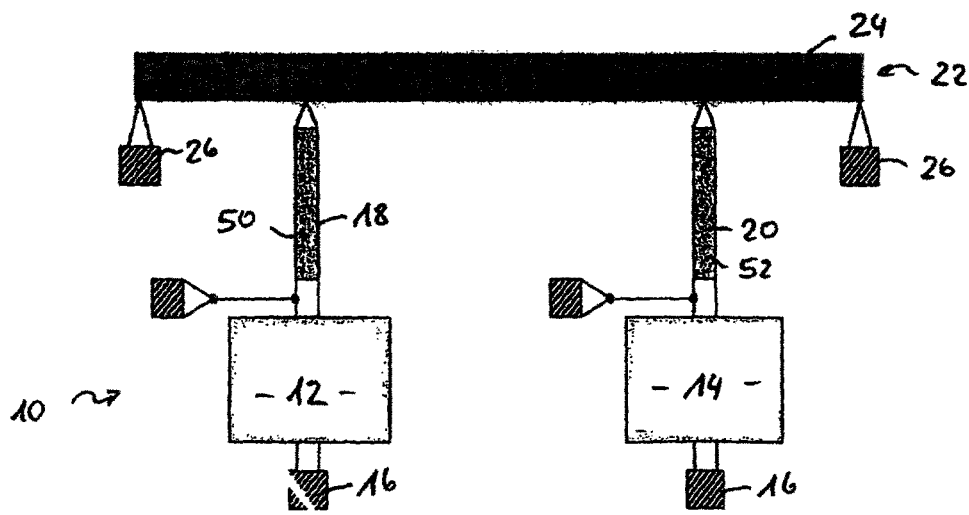
Fig. 6 - Prior Art
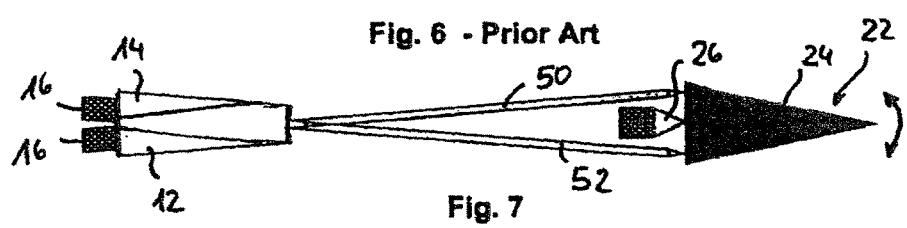
Fig. 7
(Prior Art)

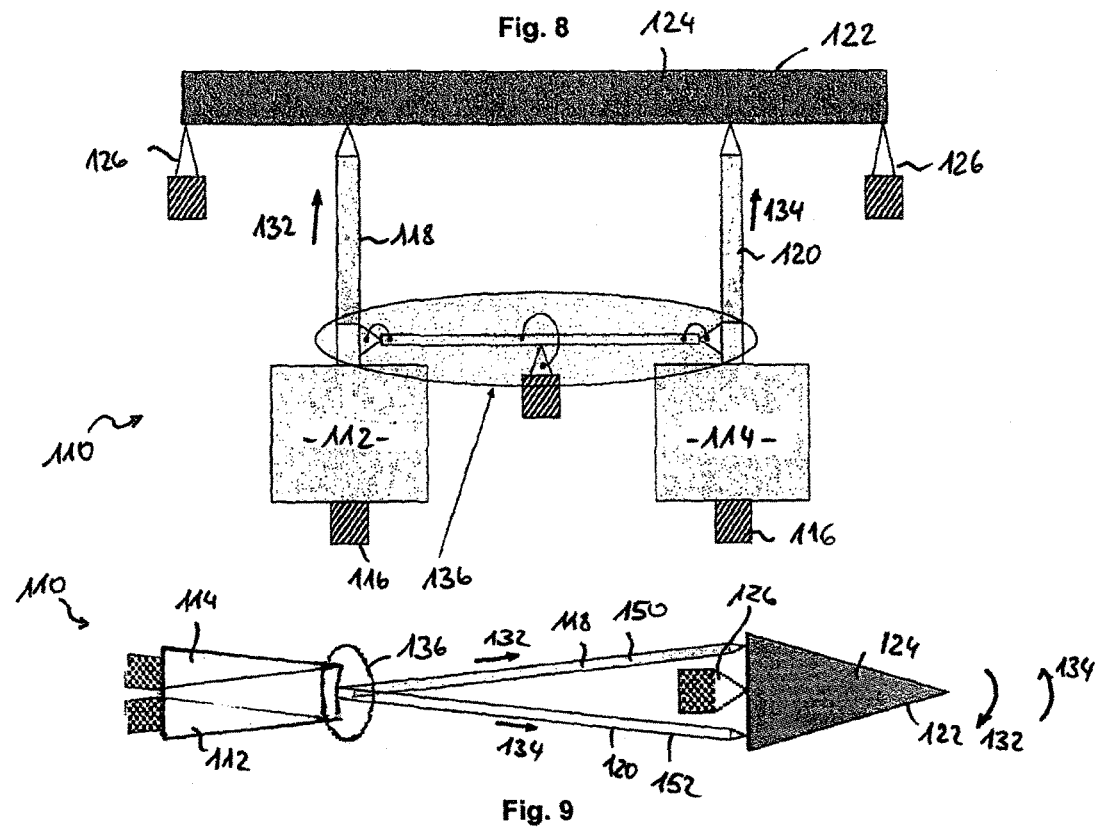
Fig. 8
Fig. 9
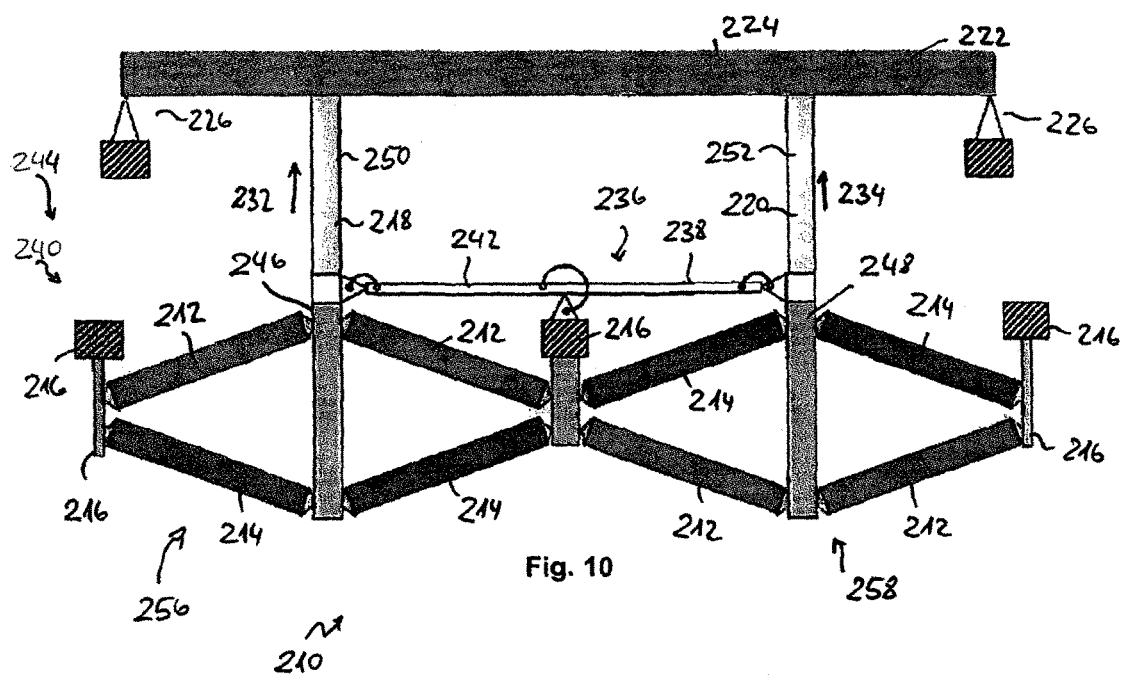
Fig. 10 ns. Orienting the actuators to have an elongation motion in the span width direction prevents the high centrifugal accelerations arising in the rotor blade from having negative influences on the operation of the actuators.

ACTUATOR ARRANGEMENT AND CONTROL SURFACE ARRANGEMENT, ESPECIALLY FOR AN AIRCRAFT

CROSS-REFERENCE TO RELATED APPLICATIONS

This application claims priority under 35 U.S.C. §119(a) to European Patent Application No. 12 197 605.4, filed on Dec. 17, 2012, the entire contents of European Patent Application No. 12 197 605.4 are hereby incorporated herein by reference.

BACKGROUND

Field of the Invention

The invention relates to an actuator arrangement comprising a first actuator for driving a driven element in a first direction and a second actuator for driving the driven element in a second direction opposite to the first direction, wherein the first and second actuators are configured to work in a counter-acting manner for moving the driven element in said first and second directions. Further, the invention relates to a control surface arrangement, especially for an aircraft, comprising a control surface element and an actuator arrangement for a controlled movement of the control surface element.

Background Information

U.S. Pat. No. 5,224,862 discloses an actuator arrangement for driving a control surface of an aircraft in the form of a flap arranged at a blade of a helicopter. Especially, U.S. Pat. No. 5,224,862 describes a piezoelectric helicopter blade actuator, wherein electrically deformable material such as a piezoelectric material is used to deform a deflectable flap on an airfoil such as a helicopter blade. The electrically deformable material is controlled to deflect the flap in a manner to control vibrations transmitted from a helicopter blade to the helicopter airframe.

US 2010/0181415 A1 describes a rotor blade for a rotary wing aircraft equipped with a movable rotor blade flap and an actuator arrangement wherein actuators are dynamically connected to a reversibly bendable supporting member for moving the flap.

A further helicopter rotor blade flap and an actuator arrangement therefore is disclosed in U.S. Pat. No. 6,231,013 B1. U.S. Pat. No. 6,231,013 B1 discloses a rotor blade for a helicopter which includes an airfoil body and a servo-actuated flap tiltably connected to the airfoil body. At least one piezoelectric actuator is arranged inside the airfoil member, and connected to the servo-flap via a transmission mechanism and connecting bar linkage so as to tiltingly deflect the servo-flap as needed. Preferably, two counter-acting piezoelectric actuators are connected to the flap via respective transmission mechanisms and connecting bar linkages. An elongation of the piezoelectric actuators in the span width direction of the airfoil member is converted or redirected into an actuating motion in the chord length direction of the airfoil member by the transmission mechanisms. Orienting the actuators to have an elongation motion in the span width direction prevents the high centrifugal accelerations arising in the rotor blade from having negative influences on the operation of the actuators.

There are several possible types of actuators for driving control surfaces such as flaps in helicopter blades. One interesting type are ceramic piezo-actuators which are made from ceramic. Ceramic can withstand high compressive forces but low tensile forces. Hence, it is advantageous to have a compression pre-load on the piezoelectric actuators.

Examples for actuator arrangements using pre-compressed actuators can be found in U.S. Pat. No. 6,294,859 B1. However, when providing pre-compression loads it is necessary to counteract such pre-loads. This brings high loads on hinges or a driven element to be driven by the actuator.

One possible solution to counteract the pre-compression loads is to have one actuator working against a spring providing the pre-compression load. The actuator is put inside a box that is not rigid and the actuator is working against the box. However, this solution leads to losses induced by the counteracting box.

A technology as presently used internally by Eurocopter and shown and explained below with reference to FIGS. 1, 3, and 7 uses an actuator arrangement having a first actuator and a second actuator wherein the first and the second actuators are working against each other. Hence, losses induced by working against flexible boxes or the like are reduced or avoided.

SUMMARY

The current solution as examined by Eurocopter is now explained referring to FIG. 1 which shows an actuator arrangement 10 including a first actuator 12 and a second actuator 14 that are supported at one end thereof on a support base 16. The other end of the actuators 12, 14 is coupled via first and second coupling mechanisms 18, 20 to a driven element 22. For example, the driven element 22 is a flap 24 that is supported on a hinge 26 for a pivotal movement. The first and second coupling mechanisms 18, 20 comprise first and second springs 28, 30, respectively, which provide a compression pre-load for the first and second actuators 12, 14.

In case that the actuator arrangement 10 is used in rotating systems such as in a helicopter blade, an additional device 32 is necessary for supporting the actuators 12, 14 against centrifugal force. Hence, the compressing force for the actuators 12, 14 is applied to all parts of the actuator arrangement and to the driven element. Increasing the compression on the actuators 12, 14 leads to an increase in the friction on the hinge as well as an increase of a wearing of the hinge.

Further, the coupling mechanisms 18, 20, which comprise tension rods or the like have to be dimensioned to be able to carry the loads which are coming from the pre-compression, and those loads are much higher than just the aerodynamic loads. Hence, the overall actuator arrangement has to be constructed in a relatively heavy manner.

An object of the invention is to provide an actuator arrangement with an improved construction, especially with regard to a control of pre-tensions and/or with regard to lightweight constructions. Further, the invention provides a control surface arrangement equipped with such an actuator arrangement.

According to a first aspect, the invention provides an actuator arrangement comprising a first actuator for driving a driven element in a first direction via a first output member and a second actuator for driving the driven element in a second direction opposite to the first direction via a second output member, wherein the first and second actuators are configured to work in a counter-acting manner for moving the driven element in said first and second directions. An additional connecting and supporting device is connected between the first output member and the second output member for supporting the output members to bear transversal forces transversal to the moving direction and/or to bear pre-load force for pre-loading the actuators. According to an exemplary embodiment, the output members are parts of the respective actuators.

Hence, according to an aspect, the invention provides, an actuator arrangement comprising a first actuator for driving a driven element in a first and a second actuator for driving the driven element in a second direction opposite to the first direction, wherein the first and second actuators are configured to work in a counter-acting manner for moving the driven element in said first and second directions. An additional connecting and supporting device is connected between the first actuator and the second actuator for supporting the actuators to bear transversal forces transversal to the moving direction and/or to bear pre-load force for pre-loading the actuators.

A preferred embodiment is characterized by a biasing means for biasing the connecting and supporting device into a neutral position and/or for providing the pre-load forces. It is preferred that the connecting and supporting device comprises a lever element or a rocker element linked between the first and second actuators. Preferably, the lever element or rocker element is supported by an elastical or flexible joint or by a bearing that engages a central part of the lever element or the rocker element.

Preferably, a portion of a fulcrum point or a fixation point where the lever element or the rocker element is centrally supported is adjustable. Preferably, the lever or rocker element comprises a connection rod. Preferably, the connection rod is flexible. Preferably, the biasing means is provided by the flexible joint and/or a flexible member, such as the flexible connection rod, of the lever element or rocker element.

It is preferred that the connecting and supporting device comprises a bearing for supporting a linkage linked between the second and first output elements or between the first and second actuators on a support base and for enabling a relative pivoting and/or bending movement between said support base and said linkage. The linkage preferably comprises or is formed by the lever or rocker element.

It is preferred that a centre of the linkage is supported by the bearing or the fulcrum or a flexible joint for a pivot and/or bending movement of the connecting rod. It is also preferred that the linkage is configured to be bent during operation of the first and/or second actuators and is centrally fixed at the support base.

A further preferred embodiment of the actuator arrangement is characterized by a first linkage joint for connecting the first actuator and the connecting and supporting device so that they can pivot relative to each other, and/or by a second linkage joint for connecting the second actuator and the connecting and supporting device so that they can pivot relative to each other. It is preferred that the first and second actuators are linked to the connecting and supporting device under compressive pre-load and that the preload force is borne and supported by the connecting and supporting device.

A further preferred embodiment of the actuator arrangement is characterized by an adjustment means for adjusting the pre-load force. It is preferred that the connecting and support device is arranged between the first and the second actuators and the driven element.

A further preferred embodiment of the actuator arrangement is characterized by a housing and/or a frame acting as support base for supporting the actuators and the connecting and support device.

A further preferred embodiment of the actuator arrangement is characterized by a first actuator means comprising a plurality of first actuators and second actuators linked together in a closed polygonal structure and the first output member that is configured to be connected to said driven element and that is moveable in said first and second directions by means of said first and second actuators of the first actuator means, and a second actuator means comprising a plurality of first actuators and second actuators that are linked together in a closed polygonal structure and the second output member that is configured to be connected to said driven element and that is moveable in said first and second directions by means of said first and second actuators of the second actuator means, wherein said first and second outputs members are coupled together via said connecting and support device.

According to a second aspect, the invention provides a control surface arrangement for an aircraft, comprising a control surface element and an actuator arrangement for a controlled movement of the control surface element, characterized in that the actuator arrangement is an actuator arrangement as defined before with the control surface element coupled thereto as driven element. It is preferred that the control surface element is a flap of a helicopter rotor blade.

Some remarkable advantages of the invention or of preferred embodiments thereof will now be explained in more detail.

In known actuator arrangements equipped with a pair of actuators counteracting to each other for providing compressive and tensile forces and which is compressed via an output or via the driven element, all necessary compressive pre-loads for compressing the actuators are effective to all parts of the output or the driven element. When for example the compressive and tensile forces are working via tensile rods or other transmission elements, such tensile rods are pre-stressed with the compressive pre-loads. Further, bearings of a driven element such as hinges of a flap or of another surface element of an aircraft have to bear all such compressive forces. Hence, the design of the whole driven part, e.g. tensile rods, elastic joints or flexible hinges, fixations such as screws or the like, or bearings are determined by compressive pre-loads of the actuators and not determined by outer loads of the driven element which loads are normally much lower than the compressive pre-loads for actuators.

Preferred embodiments or aspects of the invention aim to provide one, several or all of the following advantages:
- to avoid pre-loading of actuators via output members or driven elements;
- to have lower friction losses in bearings, supports or flexible hinges; and thereby to decrease wear and to increase maintenance intervals;
- to decrease hysteresis effects and to decrease control efforts and energy for balancing such hysteresis effects; and/or
- to provide an actuator arrangement of the kind as described in the preamble of claim 1 with the possibility of a higher first Eigen mode.

A preferred actuator arrangement of the invention has a pair of counteracting actuators which are connected in parallel to the drive output (e.g. in parallel to a helicopter servo-flap) with a rigid coupling element or connecting and supporting element which is supported via an elastic element in order to provide the possibility of an individual adjustment of pre-loads for the actuators and for a bearing of the driven element, and/or in order to bear transversal forces such as centrifugal forces of the like by the means of the coupling element or the connecting and supporting element, respectively.

An adjustment of the pre-loads for the actuators can be achieved, for example, by an adjustment of a spring deflection.

Preferably, the following advantages are achieved:
a larger degree of freedom for optimum pre-load of actuators such as piezo-elements enabling an improved performance.
small hysteresis and easy to control.
a redundant load path is provided; this improves durability and stability and decreases the risk of failure; a flap is still mounted even in case of a failure of a biasing means such as a broken or delaminated spring.
transversal forces (such as centrifugal forces) are borne simultaneously.
lower forces in the driven system (especially in tensile rods, flexor hinges); lower friction in flap bearings, lower wear, elongated maintaining interval.

A preferred embodiment of the invention belongs to the field of ceramic piezo-actuators, in particular for helicopters.

When considering piezo-actuators in aeronautics, it is advantageous to have the piezo-elements in compression. The piezo-elements are in ceramic and it is more advantageous to operate the ceramic piezos in compression and not in tension because an operation under tension would lead to a high risk of cracks. When both actuators of a pair of actuators are put in compression, there will be high loads on a hinge which is used for a flap to be operated by the operator arrangement. The compression loads are doubled because there are at least two actuators counteracting to each other. With existing principles of counteracting actuators, the compression of the piezo-elements is transferred all the way down through the overall mechanism up to the flap. An increase in the compression on the piezo-elements leads to an increase in the friction on the hinges as well as to a wearing of the hinges; hence, a first problem is referred to the hinges. A second problem can arise with tension rods or the like transmission elements transmitting the actuating operations to the driven elements. These transmission elements have to be dimensioned to be able to carry the loads which are coming from the pre-compression, and those loads are much higher than the loads derived from the aerodynamic loads. An aspect of the invention aims to get rid of this constraints because then the structure can be made lighter. With present concepts, any parts in the mechanical chain have to be stronger than necessary if only aerodynamic loads would have to be borne.

Hence, one aspect of the invention aims to avoid a propagation of compressive loads into the whole mechanism.

A preferred embodiment of the invention describes a concept of two actuators working together in a counteracting manner. According to the preferred embodiment, a mechanism is added around the actuators for additional connection and support.

Preferably, an actuator module is provided which isolates the compressive loads of the actuator elements, for example by something like a bar which can be moved. Only the actuator module itself is doing the pre-compression, which is not transmitted to the whole mechanical arrangement.

It is preferred to pre-manufacture the actuators with this mechanism. For example, the actuator arrangement is used for operating a helicopter blade flap. When this mechanism is assembled with the complete helicopter blade, the flap may be pre-assembled, the piezos with the additional connecting and supporting mechanism; a connecting and supporting device—would be manufactured outside of the blade.

In a preferred embodiment, a pair of actuators is connected in parallel to a force output with a stiff couple element in such a way that
the connection is ensured by means of a spring element (biasing means);
the pre-loading forces of the actuators and of the bearings can be individually adjusted (for example over different displacement of the springs); and/or
shear stresses are absorbed by the couple element.

The stiff couple element preferably is a lever element with two lever arms supported centrally—e.g. adjustably.

Although the invention is particularly useful for actuators with pre-compression, there are several advantages with several types of actuators. Also actuators which do not have a pre-load are possible.

Some advantages of preferred embodiments are:
larger freedom of election of the actuating and/or piezo-elements for a flap control;
higher resonance frequency, lower aging effect, improved controllability;
improved failure behaviour; shear stresses can be borne in one installation simultaneously with pre-loads;
there are lower pre-loading forces, lower friction in flap bearings, and a lower wear-out.

An interesting embodiment of the invention is an arrangement inside an actuator module for dealing for compressive loads comprising a bending rod which connects and supports the actuators.

DESCRIPTION OF THE DRAWINGS

The invention is now explained in an exemplary manner with reference to the accompanying figures, in which

FIG. 5 shows a schematic view of the actuator arrangement according to the embodiment of the invention for illustrating a special arrangement of the actuators;

FIGS. 6 and 7 show a plan view of an actuator arrangement as presently in use;

FIGS. 8 and 9 shows a plan view and a site view similar to FIGS. 6 and 7 showing the actuator arrangement according to the invention;

FIG. 10 shows a schematic view of an actuator arrangement according to a second embodiment of the invention;

DETAILED DESCRIPTION OF EMBODIMENTS

Figure 1:
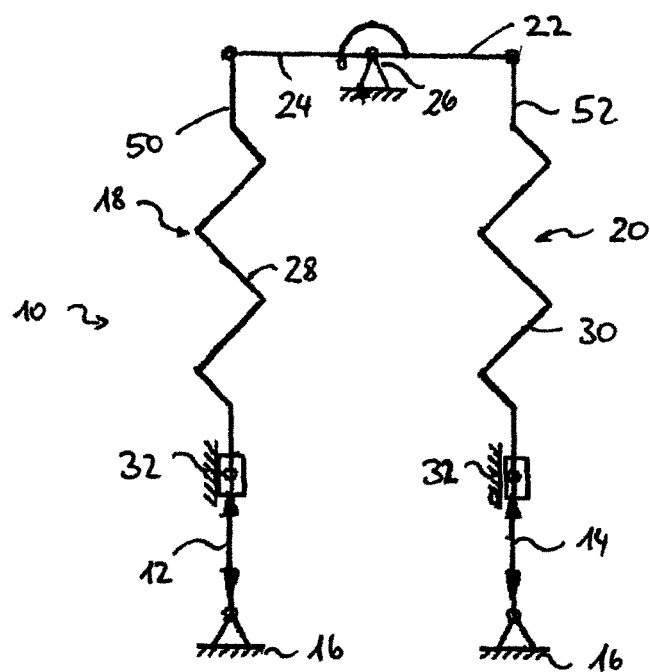
FIG. 1 shows a schematic illustration of an actuator arrangement for operating a control surface of an aeroplane as presently in use.

As already described before, FIG. 1 shows an actuator arrangement 10 according to the prior art for operating a driven element 22 in form of a flap 24 of a helicopter blade (not shown). The actuator arrangement has a pair of actuators 12, 14 which are supported on a support base 16. A first actuator 12 is coupled via a first coupling mechanism 18, for example a first tension rod 50 or the like, to the driven element 22. A second actuator 14 is coupled via a second coupling mechanism 20, e.g. a second tension rod 52, to the driven element 22. The actuators 12, 14 are compressed by a first spring 28 and a second spring 30 so that they work under compressive pre-load. Further, an additional centrifugal support device 32 is provided for each actuator 12, 14.

Figure 2:
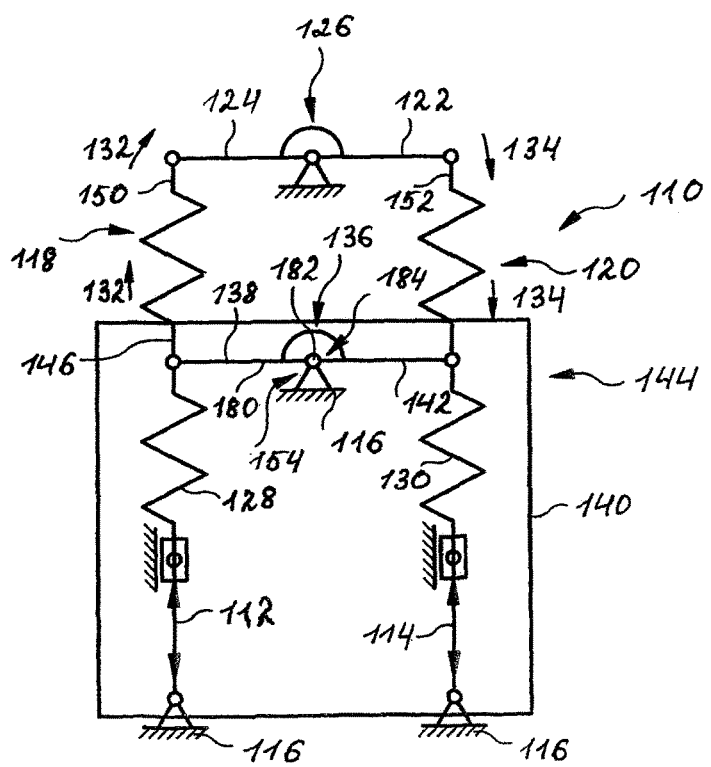
FIG. 2 shows a schematic illustration as in FIG. 1 showing an actuator arrangement according to an embodiment of an invention.

FIG. 2 shows a schematic view of a first embodiment of an actuator arrangement 110 according to the invention. As in the prior art, the actuator arrangement 110 has a first actuator 112, pre-compressed by a first spring 128 and a second actuator 114 pre-compressed by a second spring 130. The first actuator 112 is pushing a driven element 122, e.g. a control surface in form of a flap 124 via a first coupling mechanism 118, e.g. a first tension rod 150, in a first direction 132. A second actuator 114 pre-compressed by a second spring 130 pushes the driven element 122 via a second coupling mechanism 120, e.g. a second rod 152, in a second direction 134 opposite to the first direction 132. The actuators 112, 114 are supported by a support base 116.

Additionally to the known actuator arrangement 10, the actuator arrangement 110 of the invention comprises a connecting and supporting device 136 for connecting the first actuator 112 and the second actuator 114 so that the connecting and supporting devices bear transversal forces transversal to the moving directions 132, 134 and/or for bearing pre-load forces of the springs 128, 130.

Preferably, the connecting and supporting device 136 is connected in parallel to the driven element 122. The connecting and supporting device 136 has a linkage 138, linking the pair of actuators 112, 114 and supported on a support base such like the support base 116.

The linkage 138 is preferably in the form of a lever element 180 with two lever arms and a central fulcrum support 182. The fulcrum support 182 preferably has at least one flexible joint 184. The flexible joint 184 is part of a biasing means 154 for biasing the connecting and supporting device 136 into a neutral position. For example, the support base 116 comprises a housing 140 or a support frame (not shown). Hence, the support base 116 supports the actuators 112, 114 and the linkage 138.

The linkage 138 includes in a preferred embodiment a connecting rod 142 such like a bending rod. The connecting rod 142 functions as the lever element 180 and may be moved in a rocking and bending motion. A flexible bending of the connecting rod 142 provides a further biasing force for the biasing means 154. The connecting rod 142 is supported on the support base 116 via a bearing—flexible joint—in such way that the linkage joints where the actuators 112, 114 are linked to the connecting and supporting device 136 are movable in the first and second directions 132, 134.

The housing 140 or the support frame, the arrangement of first and second actuators 114, 112 and the connecting and support device 136 may be part of an to actuator module 144 that can be pre-manufactured. The connecting and supporting device 136 is arranged between the pre-loaded actuators 112, 114 and the coupling mechanisms 118, 120 coupling the actuator module 144 to the driven element 122. For example, the actuator module 144 has output connecting members 146, 148 providing connection points where the coupling mechanisms 118, 120 can be connected to.

Figure 3:
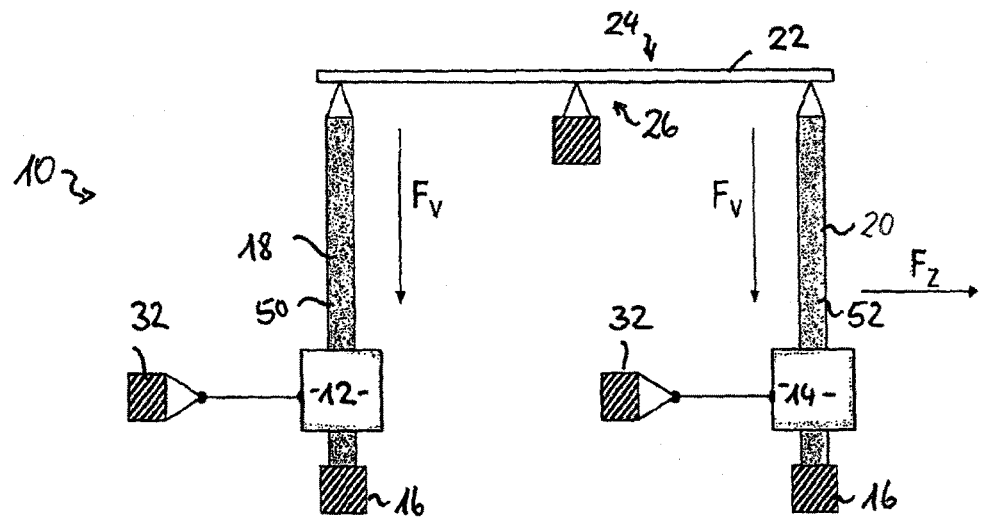
FIG. 3 shows a schematic view of the actuator arrangement as presently in use with a scheme of a force distribution.
Figure 4:
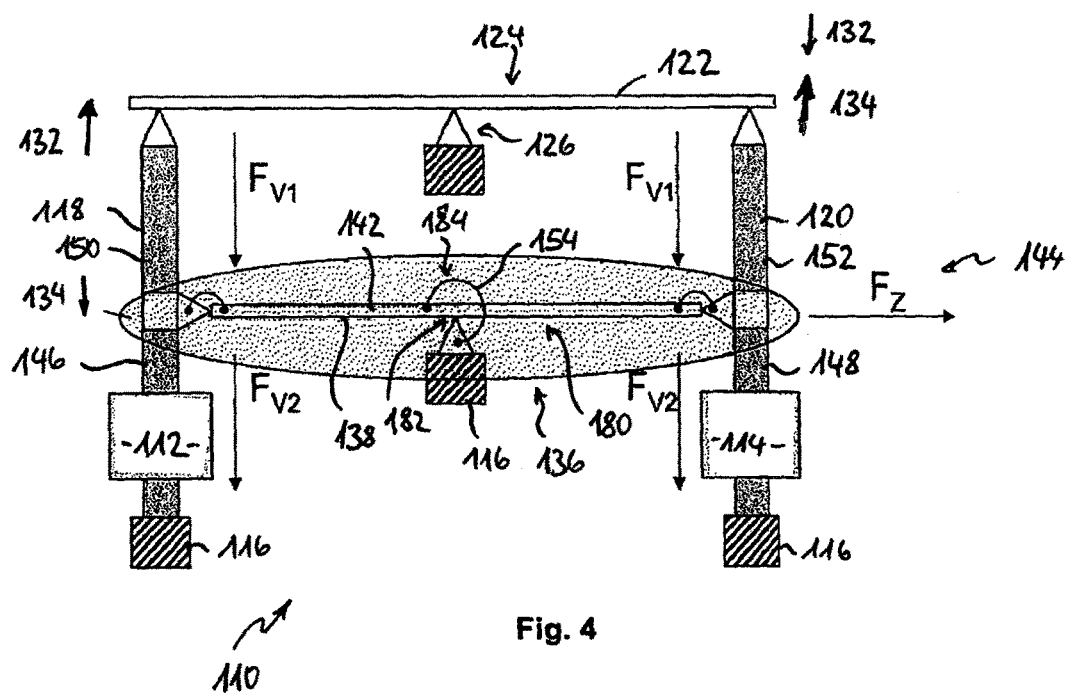
FIG. 4 is a schematic view similar to FIG. 3 showing a force distribution in the preferred embodiment of the invention.

Referring to FIG. 2, a centrifugal support device 32 is still indicated, however, the function of this centrifugal support device 32, as necessary in the prior art, can be provided by the connection and the supporting device 136 so that no additional centrifugal support device is needed. Referring to FIGS. 3 and 4, there is shown a comparison of the force distributions in the actuator arrangement 10 of the prior art, see FIG. 3, and in the actuator arrangement 110 of the embodiment of the invention, see FIG. 4.

In the actuator arrangement 10 of the prior art, the pressure forces $F_v$ to be borne by the coupling mechanisms 18, 20 and by the hinge 26 of the driven element 22 are a sum of the pre-loads for each actuator 12, 14 and the further loads due to operational forces and the aerodynamic forces or any further outer force implied on the driven element 22. Additionally, centrifugal forces $F_Z$ are working on the actuators 12, 14 so that the centrifugal support device 32 is necessary.

In the actuator arrangement 110 of the invention, compressive forces $F_{V2}$ and the centrifugal forces $F_Z$ are supported and borne by the connecting and supporting device 136 so that the coupling mechanisms 118, 120 and the driven element 122 and for example a hinge 126 of a flap 124 only has to bear the reduced forces $F_{V1}$ which correspond to operating forces and outer forces working on the driven element 122. FIG. 5 shows an illustration of the actuator arrangement 110 for indicating possible three-dimensional arrangements. As indicated, the actuator module 144 can be arranged co-planar, for example parallel to a X-Y-plane. The first and second directions 132, 134 may have a main component in Y-direction. A moving direction of the driven element can also be in the X-Y-plane with a rotation axis of the hinge 126 oriented in the Z-direction. In a variant of the special arrangement, a rotational bearing of the driven element 122 can have a rotation axis (e.g. axis of the hinge 126) parallel to the X-direction wherein the coupling mechanisms 118, 120 are connected to the driven element 122 on connecting points spaced apart from the X-Y-plane, i.e. with an offset in Z-direction. Hence, the driven element 122 can be moved for example in the X-Y-plane or can be moved in the Y-Z-plane or in any intermediate moving plane rotated about the Y-direction.

FIG. 6 and FIG. 7 show a possible three-dimensional arrangement of the actuator arrangement 10 according to the prior art wherein FIG. 6 shows a plan view shown for example from above on the top of a helicopter blade, and FIG. 7 shows a side view seen for example in the longitudinal direction of a helicopter blade. The pair of actuators 12, 14 can be arranged side by side and can act via inclined tension rods 50, 52 which form part of the coupling mechanisms 18, 20, respectively. Hence, the flap 24 can be pivoted around a pivot axis extending in the longitudinal direction of the helicopter blade.

FIG. 8 and FIG. 9 show a similar view as in FIG. 6 and FIG. 7 with regard to the actuator arrangement 110 according to the embodiment of the invention. The connecting and supporting device 136 with the connecting rod 142 as linkage 138 is arranged near the actuators 112, 114 and is pivoted or bent within a plain which is essentially parallel to the hinge axis of the flap 124. The actuators 112, 114 are connected to the flap 124 by inclined tension rods 150, 152.

FIG. 10 shows a schematic view of a second embodiment of an actuator arrangement 210 for driving a driven element 220 such as a flap 224 or any other control surface of an aircraft. The actuator arrangement 210 has first actuators 212 for moving the driven element 222 in a first direction 232 and second actuators 214 for moving the driven element 222 in a second direction 234 opposite to the first direction 232.

In the second embodiment of the actuator arrangement 210, there is provided a first actuator system 256 comprising a plurality of first actuators 212 and second actuators 214 arranged in a closed polygonal arrangement, such as, for example, described and shown in US 2005/0000311 A1 or JP 60077684A. Further, the actuator arrangement 210 comprises a second actuator system 258 including a plurality of first actuators 212 and a plurality of second actuators 214 in a similar configuration as in the first actuator system. In the second actuator system 258, the arrangement of the first and second actuators 212, 214 is mirrored with regard to the arrangement of first and second actuators 212, 214 in the first actuator system.

The first actuator system 256 has a first output connecting member 246 which is movable by operating the actuators 212, 214 in the first direction 232 and in the second direction 234 relative to a support base 216. The second actuator system 258 has a second output connection member 248 that is movable in the second direction 234 and in the first direction 232 upon operation of the actuators 212, 214 relative to the support base 216. The support base 216 may comprise a housing 240 or a frame (not shown). The first output connecting member 246 is coupled to the driven element 222 via a first coupling mechanism 218 including a first tension rod 250 or any similar transmission element. The second output connection member 248 is coupled to the driven element 222 via a second coupling mechanism 220 including a second tension rod 252.

The first and second tension rods 250, 252 may be inclined such as this is shown in FIG. 9 with regard to the first embodiment for providing a pivotal movement of the flap 224 about an pivot axis of a hinge 226. A connecting and supporting device 236 connects and supports the outputs 246, 248 of the actuator system 256, 258. The connecting and supporting device 236 includes a linkage 238, for example with a connecting rod 242 or bending bar which is supporting by the support base 216, but is movable in such way that the connecting members 246, 248 can be moved in the first and second directions 232, 234. The connecting rod 242 is a lever element 280 with two lever arms and a fulcrum bearing 182, especially in form of a flexible joint 284. The housing 240 encapsulates the actuators 212, 214 and provides a stiff frame for actuators such like piezo-elements and for bearing and supporting the connecting and supporting device 236.

This arrangement has the following advantages:
A maximum mechanical coupling can be achieved.

The actuators may be encapsulated within a housing which provides a stiff support frame and provides protection against moisture.

In contrast to actuators such as described in DE 10 2006 054 869 B3 or U.S. Pat. No. 6,794,859 B 1, there is no need for reinforcement straps or tie members for pre-compressing actuators such as piezo-actuators; piezo-actuators are rather part of a transmission mechanism.

There is the possibility to use many small piezo-elements instead of few large piezo-elements; hence, small piezo-elements which are available at low cost for many industrial purposes can be used.

High resonance frequencies are achievable.

Figure 11:
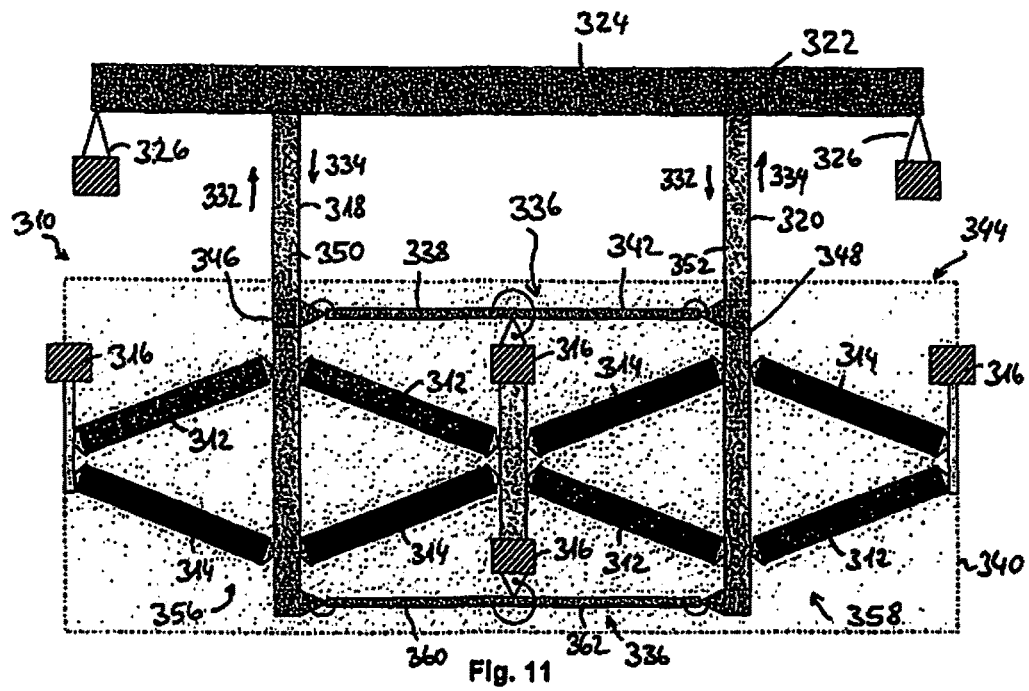
FIG. 11 shows a schematic view of an actuator arrangement according to a third embodiment of the invention.

FIG. 11 shows a third embodiment of an actuator arrangement 310 which has a similar structure as the second embodiment of the actuator arrangement 210 shown in FIG. 10. Corresponding parts bear corresponding reference numbers as in the second embodiment, summed up with 100.

Hence, there are a first actuator system 356 and a second actuator system 358 with several first and second actuators 312, 314 and a closed polygonal configuration. The only difference between the actuator arrangement 210 and the actuator arrangement 310 is that the actuator arrangement 310 of the third embodiment has a doubled connecting and supporting device 336 with a first linkage 338 and a second linkage 360, i.e. including a first and a second lever element.

In the example as shown in FIG. 11, a first connecting rod 342 centrally supported on the support base 360 and a second connecting rod 362 is provided to commonly support the output connecting members of the first and second actuator systems 356, 358. Preferably, the connecting rods 342, 362 have a mirror-inverted configuration. Hence, a doubled supporting mechanic is provided for bearing centrifugal forces.

Figure 12:
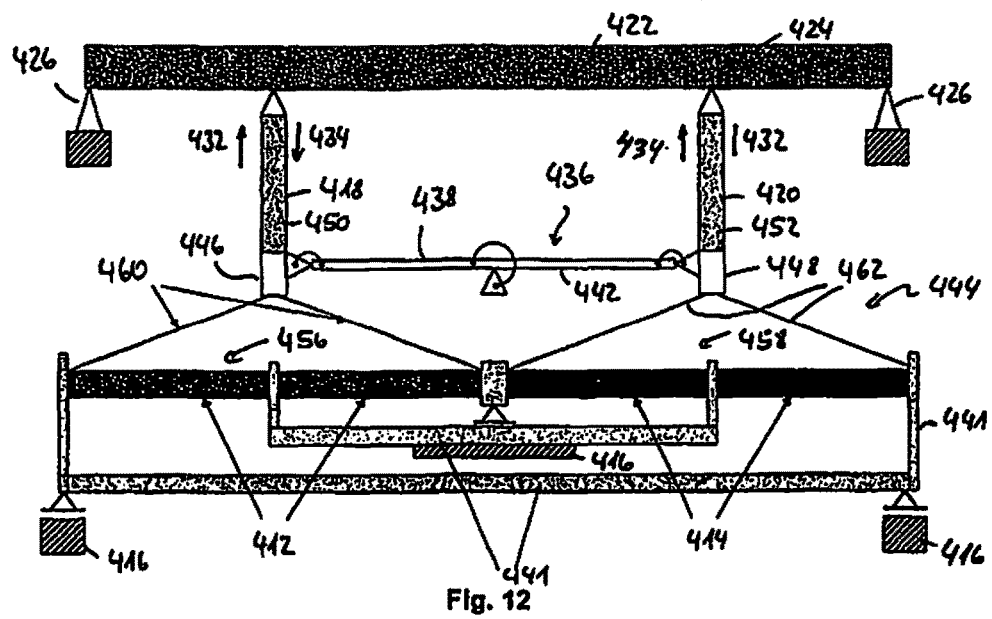
FIG. 12 shows a schematic view of an actuator arrangement according to a fourth embodiment of the invention.

FIG. 12 shows a fourth embodiment of an actuator arrangement 410 with a first actuator 412 for moving a driven element 422 in a first direction 432 and a second actuator 414 for moving the driven element 422 in a second direction 434 opposite to the first direction.

The first and second actuators 412, 414 are provided with piezo-elements in a configuration that the first actuator 412 expands when the second actuator 414 contracts and vice versa. The actuators 412, 414 are hold in a support base 416 in form of a rigid frame 441. The extraction and contracting movement is transferred via tensile straps 460, 462 into a movement of output connecting members 446, 448 in the first and second directions 432, 434. The first and second output connecting members 446, 448 are connected and supported by a connecting and supporting device 436 configured to bear the pre-compression tensile force of the tensile straps 460, 462 and/or sheer stresses such as centrifugal forces. The actuators 412, 414 with the frame 441 and the connecting and supporting device form an actuator module 444 that can be pre-manufactured. Such actuator module 444 provides the first and second output connecting members 446, 448 where first and second tension rods 450, 452 for transferring the movement of the actuators 412, 414 to the driven element 422 such as a flap 424 pivotally supported by a hinge 426 can be connected.

This actuator arrangement 410 has the following advantages:
The actuators have a larger possible length that enables large actuator movements.
A smaller transmission ratio is needed.
A high mechanical coupling can be achieved.

There is no need to provide pre-loads via the tensile straps, since compressive pre-loads can be provided by the frame 441.

The actuators do not need to bear additional compressive forces coming from outer forces or loads.

Well-proven tensile strap devices can be used with this actuator arrangement 410; a reverse of direction can be achieved in the driven system by folding the tensile straps into the other direction—see also DE 100 17 334 A1.

High resonance frequency is achievable.

Free choice of manufacture for piezo-elements or similar actuators.

Figure 13:
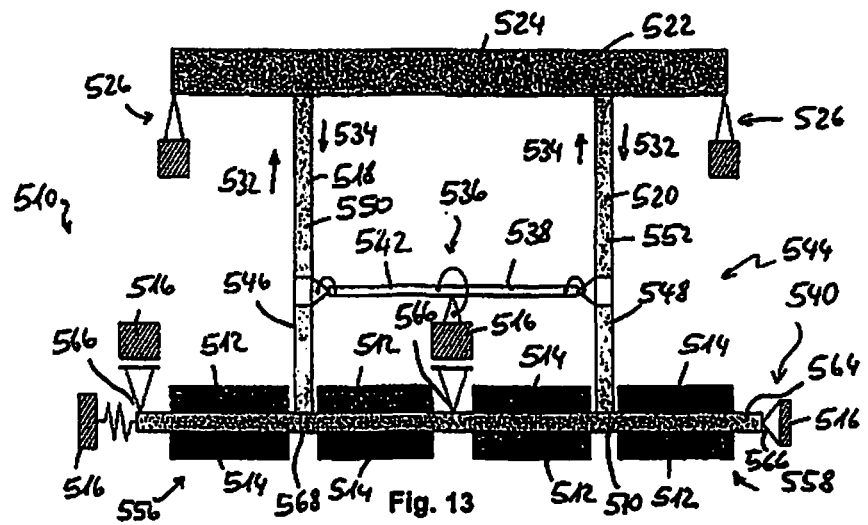
FIG. 13 shows a schematic view of an actuator arrangement according to a fifth embodiment of the invention.

FIG. 13 shows a fifth embodiment of an actuator arrangement 510 wherein corresponding parts have the reference numbers as used in the fourth embodiment of the actuator arrangement 410, summed up with 100. The actuator arrangement 510 has first actuators 512 and second actuators 514 which are working together in a counteracting manner to drive a driven element 522 in a first direction 532 and a second direction 434 opposite to the first direction 532.

The actuator arrangement 510 has a flexible support bar 564 that is supported by three support points spaced apart from each other on a support base 516 such as a housing 540 or a frame. The flexible support bar 564 is linked at the support points in a pivotally manner. A central support point divides the flexible support bar 564 in a first and a second portion 568, 570.

At the first portion 568, the flexible support bar 564 is equipped on one side thereof with first actuators 512 and on the opposite second side thereof with second actuators 514. At the second portion 570, the flexible support bar 564 is equipped at the first side with second actuators 514 and at the opposite second side with first actuators 512. In its longitudinal direction, the flexible support bar 564 is pre-loaded with a compressive force.

The actuators 512, 514 are bounded, for example with an adhesive, over the whole contact surface or partially at the ends thereof, to the flexible support bar 564. By expanding or contraction of the first and second actuators in a counteracting manner, the flexible support bar 564 is bent in the form of an "S". Hence, the centre of the first portion 568 moves in the first direction 532 when the centre of the second portion 570 moves in the second direction 534 and vice versa. The first and second portions 568, 570 which form first and second actuator systems 556, 558 are providing first and second output connection members 546, 548 to be connected via first and second coupling mechanisms 518, 520 to the driven element 522 such as a flap 524 with a hinge 526. The output connecting members 546, 548 are linked, connected, and supported by a connecting and supporting device 536, comprising a linkage 538 such as a connecting rod 542 that is fixed in a pivotal moving manner to the support base 516.

For further details of the actuator arrangement 510 with the flexible support bar 564, it is expressly referred to DE 10 2005 060 779 A1 and DE 10 2005 061 752 A1, all incorporated by reference.

Such actuator arrangement 510 has the following advantages:

A pre-stress of the flexible support bar amplifies the deflection (servo-effect).

Cascading is possible by connecting several active flexible support bars 564 equipped with first and second actuators in parallel.

Piezo-elements can adhere directly on the flexible support bar or can be connected via spacers at the ends of the piezo-elements.

High mechanical coupling can be achieved due to the pre-load of the flexible support bar 564 in the direction transverse to the first and second directions.

There is no need for tensile straps; the piezo-elements are part of the transmission mechanism.

High resonance frequency is achievable.

Piezo-elements can be freely chosen, for example d31 or d33 actuators can be used.

The piezo-elements can be pre-loaded by compressive forces when they are adhered to the flexible support bar; hence, they work in the compressive range and are very stable.

Figure 14:
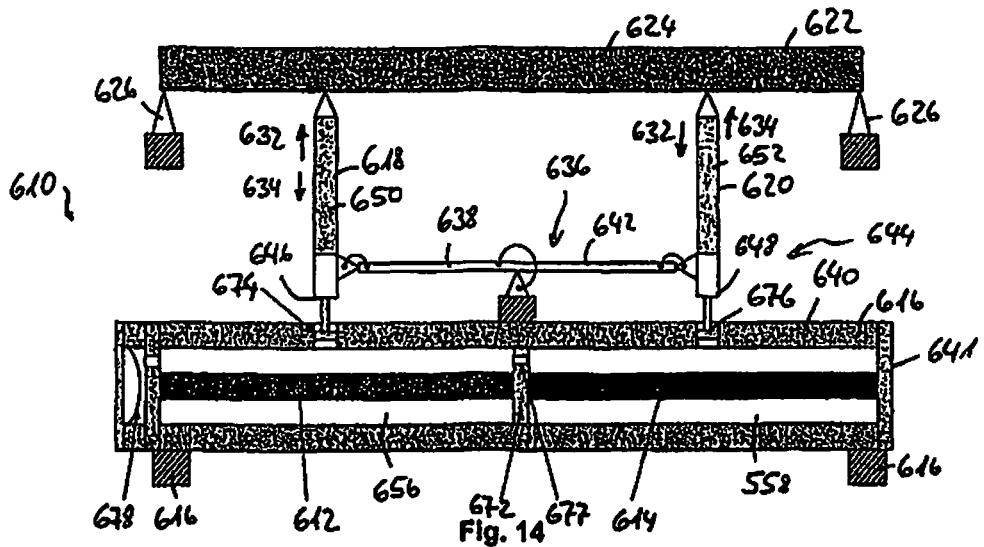
FIG. 14 shows a schematic view of an actuator arrangement according to a sixth embodiment of the invention.

FIG. 14 shows a sixth embodiment of an actuator arrangement 610 wherein corresponding parts bear corresponding reference numbers as in the fifth embodiment of FIG. 13, summed up with 100.

The actuator 610 arrangement has a first actuator 612 and a second actuator 614 that counteract to each other for moving a driven element 622 such as a flap 624 pivotally mounted on a hinge 626 into a first direction 632 or a second direction 634 that is opposite to the first direction 632. The actuator arrangement 610 has a rigid housing 640 as support base 616 that provides a frame 641 for pre-loading the first and second actuators 612, 614 with compressive force. The housing 640 has a first fluid chamber 656 and a second fluid chamber 658 which are separated from each other by a movable separating piston 672. The separating piston 672 is moved by the first and second actuators 612, 614 to simultaneously change the volume of the fluid chambers 656, 658.

A first driven piston 674 is in fluid communication with the first fluid chamber 656 and provides a first output connecting member 646 to be connected via a first tension rod 650 of a first coupling mechanisms 618 to move the driven element 622 in one of the first and second directions 632, 634. A second driven piston 676 is in fluid communication with the second fluid chamber 658 and provides a second output connection member 648 to be connected via a second tension rod 652 of a second coupling mechanism 620 to the driven element 622 for driving the same into the other of the first and second direction 632, 634. Output connecting members 646, 648 coupled to the first and second driven piston 674, 676 are connected and supported by a connecting and supporting device 636 having a linkage 638 such as a flexible or pivotally supported connecting rod 642. The connecting and supporting device 636 is supported on the support base 616, e.g. the housing 640. The first and the second actuators 612, 614 are preferably equipped with piezo-elements wherein the piezo-elements of the second actuator 614 are phase shifted with regard to the piezo-elements of the first actuator 612.

The separating piston 672 has a small through-hole 677 to provide a low-pass function. At least one of the fluid chambers 656, 658 is in fluid connection with a pressure reservoir 678.

The actuator arrangement 610 has the following advantages:

The frame 641 of the housing 640 provides pre-load and simultaneously functions as a hydraulic piston cylinder.

The housing 640 and the fluid chambers 656, 658 provide a cooling system, an electrical insulation and a protection against water or similar moisture by encapsulating the piezo-element with hydraulic oil.

By using bellows in the area of the driven pistons 674, 676, a fully closed system can be achieved.

The piezo-actuators can have a large length and can provide a large moving range; only small transmission ratios are needed, and a high mechanical coupling is possible.

High resonance frequencies can be achieved.

No need of tensile straps.

Free choice of manufacture.

Figure 15:
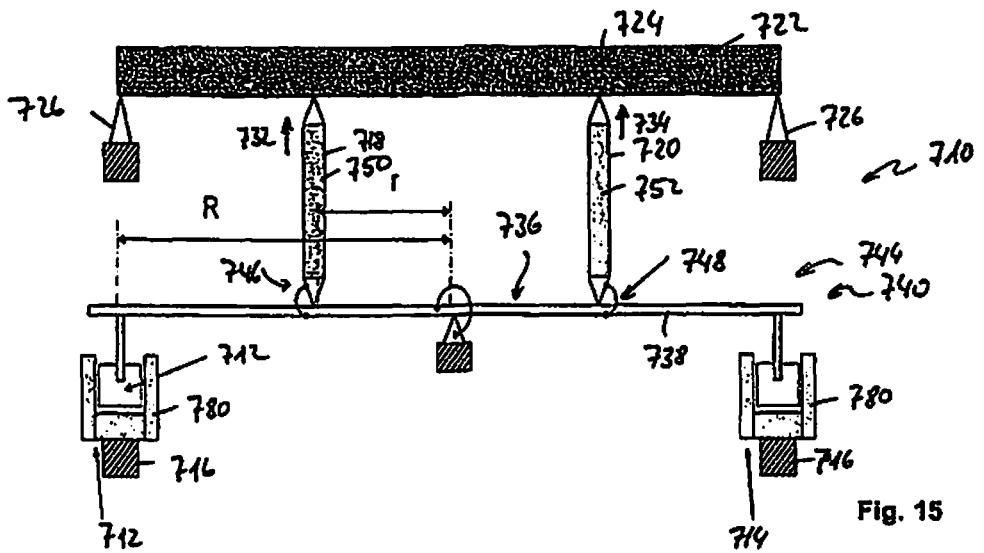
FIG. 15 shows a schematic view of an actuator arrangement according to a seventh embodiment of the invention.

FIG. 15 shows a seventh embodiment of an actuator arrangement 710 wherein a connecting and supporting device 736 having a linkage 738 in form of a flexible, bendable or pivotally supported connecting rod 772 is used in conjunction with a first actuator 712 and a counteracting second actuator 614. The first and second actuator 712, 714 are solenoid actuators equipped with an electromagnetic coil 780. The linkage 738 of the connecting and supporting device 736 is connected on adjustable first and second output connecting members 746, 748 via first and second tension rods 750, 752 of a first and second coupling mechanism 718, 720 to the driven element 722 such as a flap 724 with a hinge 726.

By operating the electromagnetic coils 780 of the first and second actuator 712, 714 in a counteracting manner, the driven element 722 is moved in one of a first and second direction 732, 734. A transmission ratio for transmitting actuator movements to the driven element 722 is determined by the ratio of the distances R/r (preferably with R/r>2); wherein R is the distance between the respective actuator 712, 714 and the central support bearing of the connecting rod 742 and r is the distance between the output connection member 746, 748 and the central support bearing of the connecting rod 742.

All of the first to seventh embodiments of the actuator arrangement 110, 210, 310, 410, 510, 610, 710 comprise a connecting and supporting device 136, 236, 336, 436, 536, 636, 736. In the following, preferred embodiments and variants of such connecting and supporting devices that are usable as the connecting and supporting device 136, 236, 336, 436, 536, 636, 736 of all of the first to seventh embodiments of the actuator arrangement 110, 210, 310, 410, 510, 610, 710 are described with reference to FIGS. 16 to 20.

The connecting and supporting device of the FIGS. 16 to 20, now generally referred to with the reference number 1000, generally includes a linkage 1002 for connecting and supporting a first output member 1004 and a second output member 1006 of the actuator arrangement 110, 210, 310, 410, 510, 610, 710. The linkage 1002 preferably is as an elongated member such like a bar, a plate, or a connection rod 1008. Preferably, the linkage 1002 has the form of a lever element 1080 with two arms and a central fulcrum point 1082 supported on the support base 1012. Therefore, the connecting and supporting device 1000 has a support bearing 1010 for supporting a central portion of the linkage 1002 on a support base 1012 such as the support base 116, 216, 316, 416, 516, 616, 716 or the housing 140, 240, 340, 440, 540, 640, 740 or a frame 441, 641, and a first link joint 1014 for linking the linkage 1002 to the first output element 1004 and a second link joint 1016 for linking the linkage 1002 to the second output element 1006.

The linkage 1002 especially formed as a connecting rod 1003 or connecting bar has a predefined flexibility so that it can be bent in a predetermined manner. The support bearing 1010 is arranged on a central portion of the linkage 1002 between the first and second link joints 1014, 1016 provides an articulated, flexible or hinged joint between the linkage 1002 and the support base 1012, has a predetermined torsional rigidity and a high rigidity against transversal forces or sheer forces. Preferably, the actual position of the support bearing 1010—the fulcrum point 1082—can be adjusted. Preferably, the support bearing 1010 includes at least a first flexible joint 1018.

The first and second link joints 1014, 1016 provide an articulated or flexible or hinged joint between the linkage 1002 and the respective output element 1004, 1006, provides a connection for connecting actuator outputs and coupling mechanisms coupling the actuators to the drive element such as the tension rods 150, 250, 350, 450, 550, 650, 750; 152, 252, 352, 452, 552, 652, 752. In a preferred embodiment, the first and second link joints 1014, 1016 have a predetermined torsional rigidity. Preferred materials for the linkage 1002 are metal such as steel or light metal like aluminium materials or fibre reinforced composite material such as CFC or GFC.

The flexible rigidity and the torsional rigidities of the bearings and joints and of the linkage are adapted and adjusted to adjust the wished forces and rigidities. Especially, the first flexible joint 1018 and the flexible connecting bar or connecting rod 1003 provide a biasing means 1084 for biasing the connecting and supporting device 1000 into a neutral position.

Figure 16:
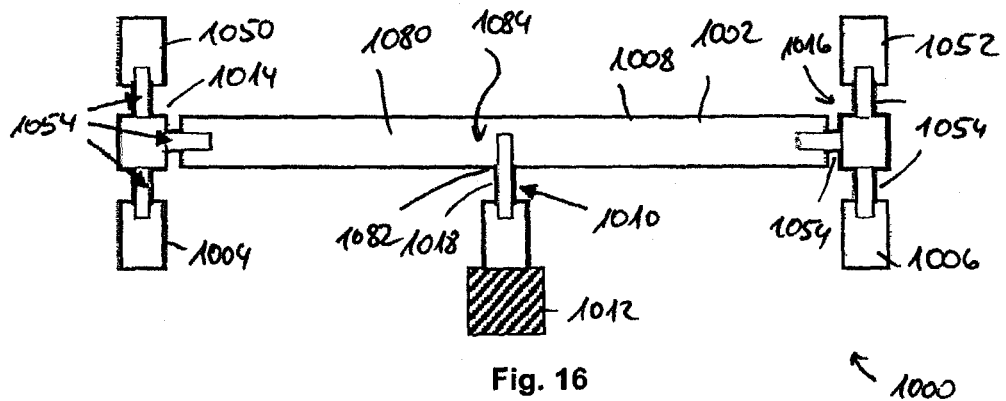
FIG. 16 shows a schematic view of a first embodiment of a connection and support device to be used in any of the first to seventh embodiments of the actuator arrangements.

FIG. 16 shows an embodiment having the first flexible joint 1018 as sole joint of the support bearing 1010.

Figure 17:
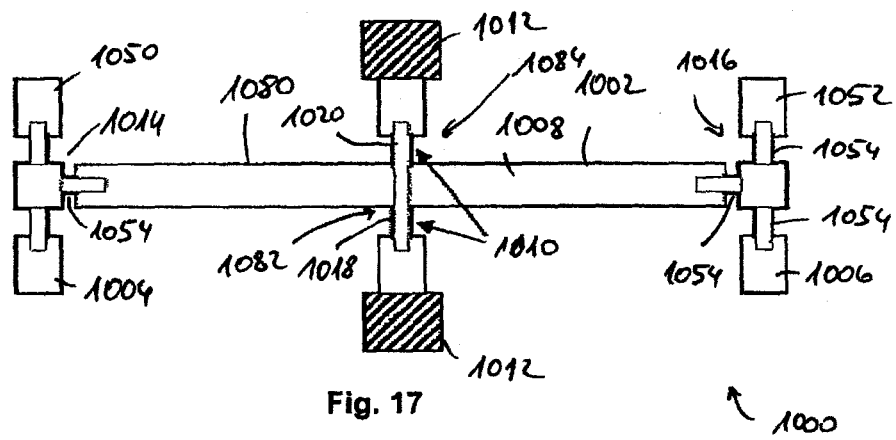
FIG. 17 shows a schematic view of a second embodiment of the connection and support device.

FIG. 17 shows an embodiment of the connecting and supporting device 1000 having the first flexible joint 1018 and a second flexible joint 1020 for forming the support bearing 1010. Hence, a double-support from two sides is provided.

Figure 18:
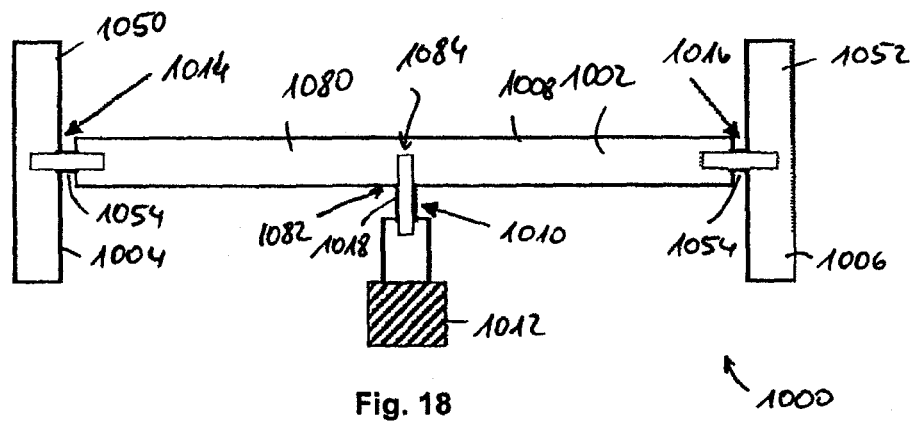
FIG. 18 shows a schematic view of a third embodiment of the connection and support device.

Referring to FIG. 18, there is shown an embodiment of the connecting and supporting device 1000 wherein the first and second link joints 1014, 1016 are configured to provide a rigid connection—for example integral connection—between the output elements 1004, 1006 and the corresponding tension rods 1050, 1052 and a flexible or elastic joint between this rigid connected system of output element 1004, 1006 and tension rod 1050, 1052 at the one hand and the linkage 1002 at the other hand.

Figure 19:
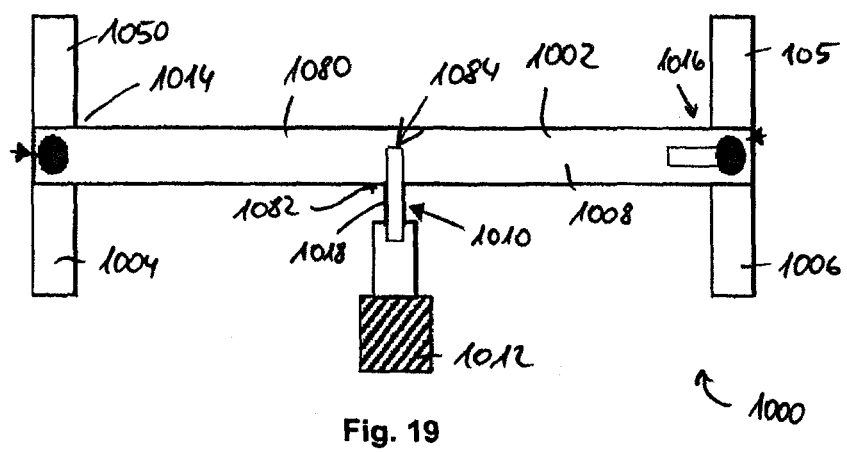
FIG. 19 shows a schematic view of a fourth embodiment of the connection and support device.

The embodiment of FIG. 19 shows a rigid connection between the output element 1004, 1006 and the tension rod 1050, 1052 similar as in FIG. 18, but a pivot joint enabling a rotation relative movement between the linkage 1002 and the connected system of output elements 1004, 1006 and tension rods 1050, 1052. In at least one of the first and second link joints 1014, 1018 there is a limited degree of freedom to move in a transversal direction—e.g. by provision of a slot.

Figure 20:
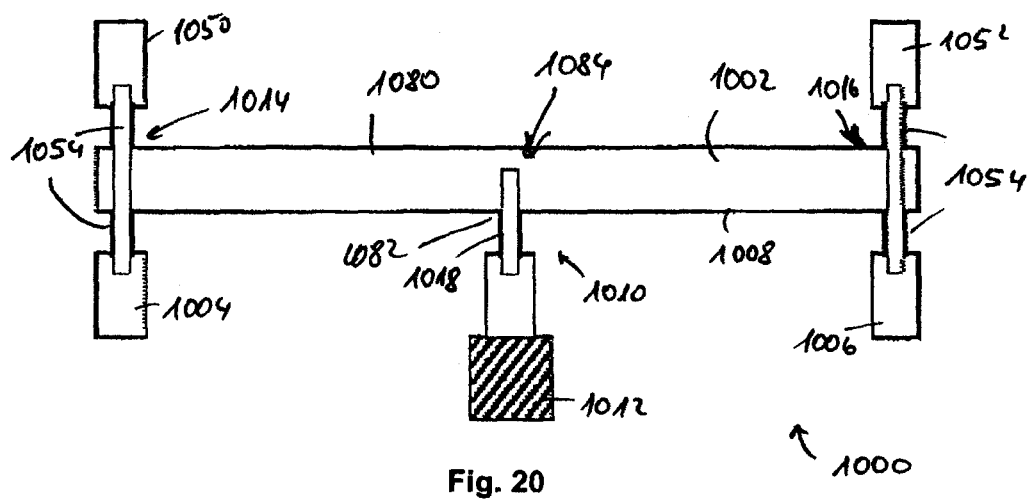
FIG. 20 shows a schematic view of a fifth embodiment of the connection and support device.

In the embodiment of FIG. 20, the first and second link joints 1016, 1018 are elastically linked via flexible joints both to the output elements 1004, 1006 and to the tension rods 1050, 1052.

What is claimed is:

1. An actuator arrangement comprising:
a first actuator configured to drive a driven element in a first direction via a first output member;
a second actuator configured to drive the driven element in a second direction opposite to the first direction via a second output member, such that the first and second actuators are configured to work in a counter-acting manner to move the driven element in the first and second directions; and
an additional connecting and supporting device connected between the first output member and the second output member and configured to support the output members and bear a pre-load force to pre-load the actuators.

2. The actuator arrangement according to claim 1, further comprising
a biasing element configured to at least one of bias the connecting and supporting device into a neutral position and provide the pre-load forces.

3. The actuator arrangement according to claim 1, wherein
the connecting and supporting device comprises at least one of
a connecting rod linked between the first and second output members; and
a lever element having a first and a second lever arm and a fulcrum point there between, the lever element being linked between the first and second output members.

4. The actuator arrangement according to claim 1, wherein
the connecting and supporting device comprises a bearing configured to support a linkage linked between the second and first output members on a support base and to enable at least one of a relative pivoting and bending movement between the support base and the linkage.

5. The actuator arrangement according to claim 3, wherein
at least one of a centre portion of the connecting rod and a center portion of the lever element is supported by the support bearing for at least one of a pivot and bending movement of the connecting rod or the lever element respectively.

6. The actuator arrangement according to claim 3, wherein
the connecting rod is configured to bend during operation of at least one of the first and second actuators.

7. The actuator arrangement according to claim 1, further comprising at least one of
a first link joint configured to connect the first output member and the connecting and supporting device so that they can pivot relative to each other; and
a second link joint configured to connect the second output member and the connecting and supporting device so that they can pivot relative to each other.

8. The actuator arrangement according to claim 1, wherein
the first and second actuators are linked to the connecting and supporting device under compressive pre-load and the preload force is borne and supported by the connecting and supporting device.

9. The actuator arrangement according claim 1, further comprising
an adjustment component configured to adjust a pre-load force to preload the first and second actuators.

10. The actuator arrangement according to claim 1, wherein
the connecting and support device is arranged between the first and second actuators and the driven element.

11. The actuator arrangement according to claim 1, further comprising
at least one of a housing and a frame configured as a support base to support the actuators and the connecting and support device.

12. The actuator arrangement according to claim 1, further comprising
a first actuator system comprising a plurality of first actuators and second actuators linked together in a closed polygonal structure, and a first output member that is configured to connect to the driven element and is moveable in the first and second directions by the first and second actuators of the first actuator system; and
a second actuator system comprising a plurality of first actuators and second actuators linked together in a closed polygonal structure, and a second output member that is configured to connect to the driven element and is moveable in the first and second directions by the first and second actuators of the second actuator system.

13. A control surface arrangement for an aircraft, the control surface arrangement comprising
a control surface element and an actuator arrangement according to claim 1, the actuator arrangement being configured to control movement of the control surface element that is configured as the driven element.

14. The control surface arrangement according to claim 13, wherein
the control surface element is configured as a flap of a helicopter rotor blade.

15. The actuator arrangement according to claim 2, wherein
the connecting and supporting device comprises at least one of
a connecting rod linked between the first and second output members; and
a lever element having a first and a second lever arm and a fulcrum point there between, the lever element being linked between the first and second output members.

16. The actuator arrangement according to claim 2, wherein
the connecting and supporting device comprises a bearing configured to support a linkage linked between the second and first output members on a support base and to enable at least one of a relative pivoting and bending movement between the support base and the linkage.

17. The actuator arrangement according to claim 2, further comprising at least one of
a first link joint configured to connect the first output member and the connecting and supporting device so that they can pivot relative to each other; and
a second link joint configured to connect the second output member and the connecting and supporting device so that they can pivot relative to each other.

18. The actuator arrangement according to claim 2, wherein
the first and second actuators are linked to the connecting and supporting device under compressive pre-load and the preload force is borne and supported by the connecting and supporting device.

19. The actuator arrangement according claim 2, further comprising
an adjustment component configured to adjust a pre-load force to preload the first and second actuators.

20. The actuator arrangement according to claim 2, wherein
the connecting and support device is arranged between the first and second actuators and the driven element.

* * * * *